Sept. 20, 1966 H. A. JAMES 3,273,828
DOUBLE DELTA FLEXIBLE WING
Filed Aug. 7, 1964 2 Sheets-Sheet 1

INVENTOR.
HARRY A. JAMES
BY
Knox & Knox

INVENTOR.
HARRY A. JAMES
BY Knox & Knox

United States Patent Office 3,273,828
Patented Sept. 20, 1966

3,273,828
DOUBLE DELTA FLEXIBLE WING
Harry A. James, San Diego, Calif., assignor to The Ryan Aeronautical Co., San Diego, Calif.
Filed Aug. 7, 1964, Ser. No. 388,124
7 Claims. (Cl. 244—43)

The present invention relates to aircraft and more specifically to a double delta flexible wing.

The primary object of this invention is to provide a flexible wing wherein the basic primary wing structure is undisturbed and small secondary delta wing portions are mounted outboard of the main wing, with means for adjusting the secondary portions to provide lateral and longitudinal control, the arrangement increasing the effective aspect ratio of the wing and improving the lift-drag ratio.

Another object of this invention is to provide a double delta flexible wing in which the control forces are minimized, since the main wing remains a stable aerodynamic platform and is not adjusted or distorted by control actions.

A further object of this invention is to provide a double delta flexible wing wherein the secondary delta wing portions and their controls are adaptable to the well-known basic type of flexible wing.

In the drawings.

Similar characters of reference indicate similar or identical elements and portions throughout the specification and throughout the views of the drawing.

WING STRUCTURE

Figure 1:
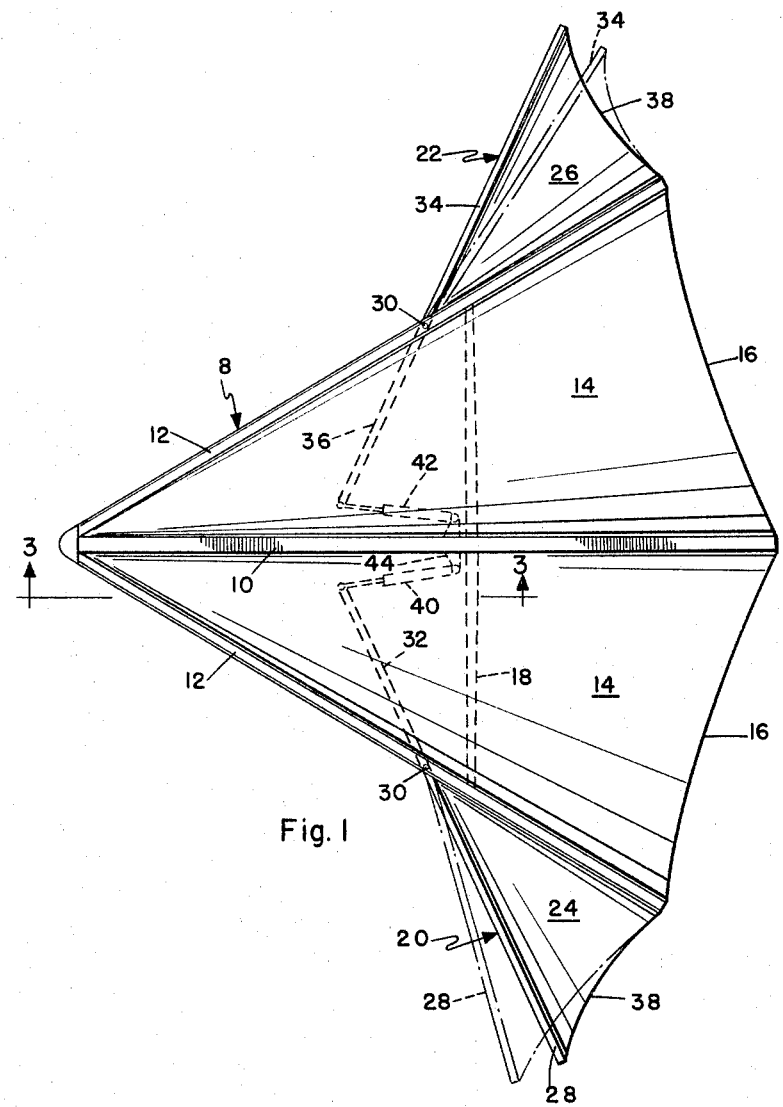
FIGURE 1 is a top plan view of the double delta wing.

The basic flexible wing 8 comprises a rigid, longitudinal central keel 10 with a pair of rigid leading edge members 12 secured to the forward end of the keel and extending angularly rearwardly on opposite sides thereof. Secured to and between the keel 10 and leading edge members 12 are flexible wing panels 14, resulting in a wing of generally triangular or delta configuration. The trailing edges 16 of panels 14 are freely flexible and the panels bow upwardly under aerodynamic load. The sweep back angle of leading edge members 12, and thus the bowing of the panels 14, are controlled by a spreader bar 18 extending laterally on opposite sides of keel 10 and being secured at its ends to said leading edge members, as in FIGURE 7. The materials and specific structure used will depend on the size and intended purpose of the wing.

Outboard of the rear outer portions of the primary wing 8 are secondary wings 20 and 22 having substantially triangular flexible wing panels 24 and 26, respectively, which are secured along their inner edges to leading edge members 12. The leading or outer edge of panel 24 is secured to and supported by a leading edge boom 28 which is pivotally connected, at the forward apex of said panel, to the leading edge member 12 by a hinge 30 to swing substantially in the plane of the leading edge members. Boom 28 has an integral, inwardly extending control arm 32. Wing panel 26 is similarly supported by a leading edge boom 34 attached to the adjacent leading edge member 12 by a hinge 30 and having an inwardly extending control arm 36. The trailing edges 38 of panels 24 and 26 are freely flexible.

Figure 2:
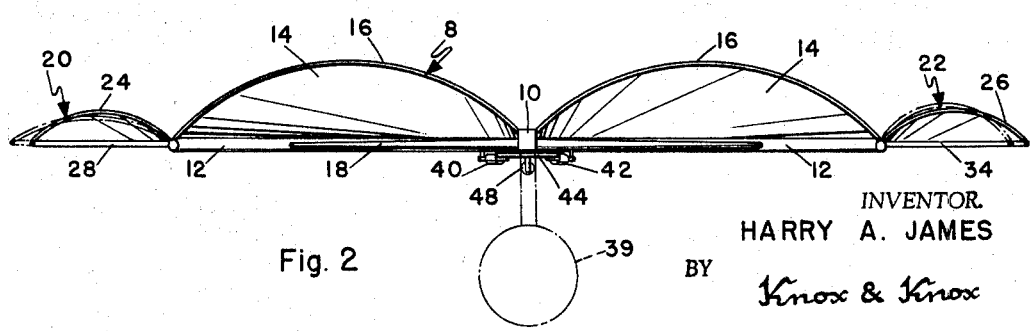
FIGURE 2 is a rear elevation view thereof.
Figure 3:
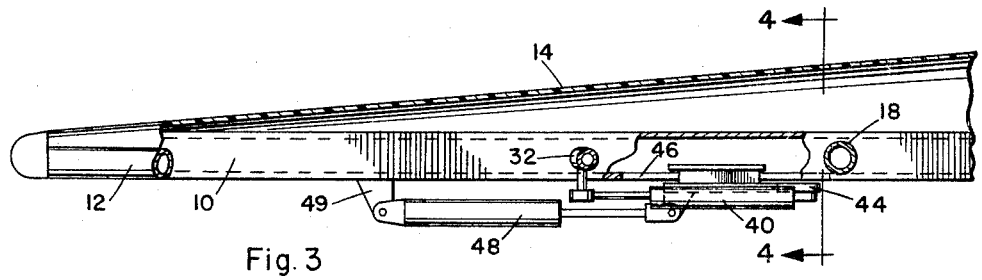
FIGURE 3 is an enlarged fragmentary sectional view taken on line 3—3 of FIGURE 1.
Figure 4:
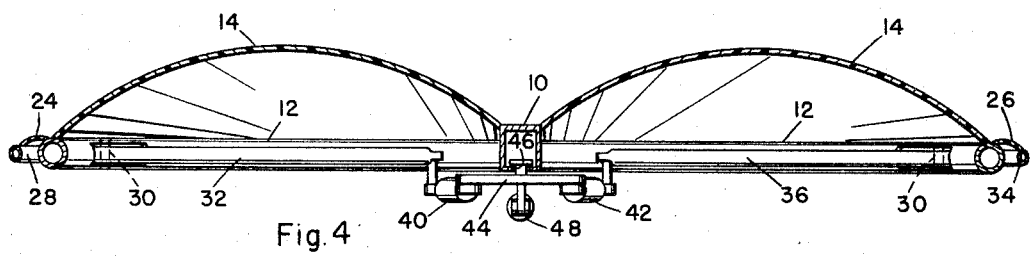
FIGURE 4 is a sectional view taken on line 4—4 of FIGURE 3.

Any suitable payload can be suspended from keel 10 in an appropriate manner, as indicated at 39 in FIGURE 2.

CONTROL SYSTEM

Various types of control systems can be used, that illustrated being one suitable example and not intended as limiting.

Figure 5:
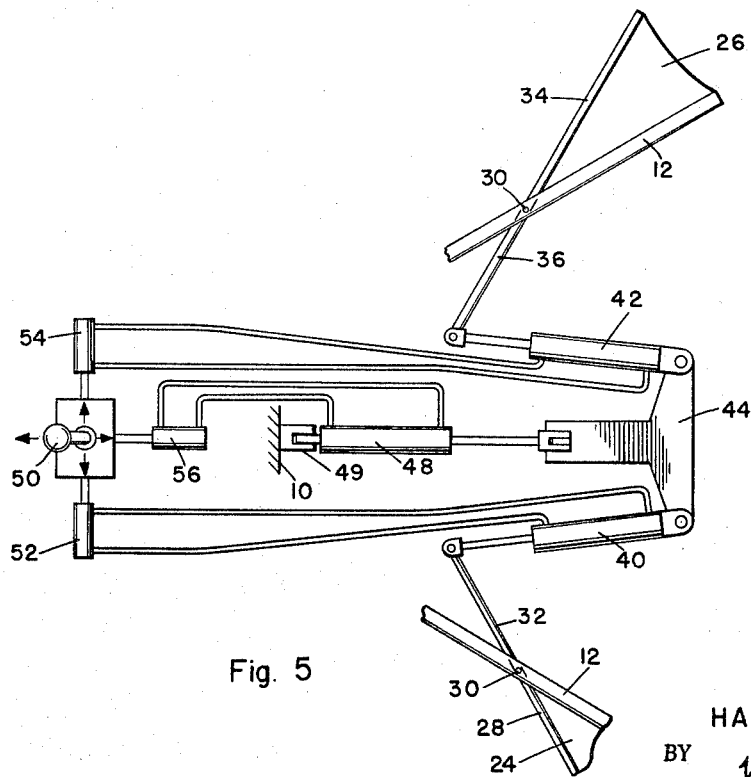
FIGURE 5 is a diagram of a suitable control system.

Control arms 32 and 36 are connected to roll actuators 40 and 42, respectively, said actuators being coupled to a carriage 44 which is longitudinally slidable in a track 46 in keel 10. Roller guides or the like could be used to minimize friction. The carriage 44 is connected to a pitch actuator 48 which is attached to a bracket 49 on keel 10. An aircraft type control stick 50 is used for control and is movable laterally to actuate a pair of roll control units 52 and 54, coupled respectively to the roll actuators 40 and 42. Fore and after motion of stick 50 operates a pitch control unit 56 coupled to pitch actuator 46, as in FIGURE 5. The various control units and actuators may be fluid pressure operated, electrical, or other well-known means of conveying control stick motions to movable controls.

OPERATION

In flight the wing panels 14 and panels 24 and 26 will be bowed upwardly by aerodynamic loads, as indicated in FIGURE 2. In normal level flight the bowing and the wing plan form will be symmetrical about the keel 10.

When control stick 50 is moved to the right, as for a right turn, actuator 40 will pull arm 32 rearwardly, causing boom 28 to swing forward and extend or spread the wing panel 24 to increase its effective plan form area. The panel 24 is also flattened out somewhat, the decrease in the upward bowing causing an effective increase in the angle of attack of secondary wing 20, the total action resulting in an increase in lift. At the same time actuator 42 pushes arm 36 forward, which swings boom 34 to the rear, retracting and decreasing the effective area of panel 26, while increasing the bowing of the panel and causing a decrease in angle of attack of secondary wing 22, which decreases the lift thereof. These offset positions are indicated in broken line in FIGURES 1 and 2. The resultant unsymmetrical lift will cause the wing to roll to the right in the manner of conventional aileron action.

Motion of stick 50 forwardly will cause actuator 48 to move carriage 44 rearwardly, pulling arms 32 and 36 back and extending both secondary wings 20 and 22. The resultant increase in lift aft of the center of lift of wing 8 will cause a nose down pitching of the wing, as if by down elevator action of a conventional aircraft. Rearward motion of stick 50 will retract secondary wings 20 and 22, the decrease in lift causing a nose up pitching of the wing. By combinations of stick motions, full pitch and roll control can be obtained.

Since the secondary wings are of small area relative to the main wing, control forces are minimized and the inherently stable form of the main wing is undisturbed. Reaction forces are, however, considerable due to the long moment arm of the movable outboard wing portions and the relationship of the centers of pressure of the secondary wings to that of the main wing. The double delta configuration formed by the secondary wings outboard of the main wing results in an increase in effective aspect ratio, which improves the lift-drag ratio of the wing, the phenomenon being well known. The ratio of area of the secondary wings to the main wing will vary according to the use of the wing and degree of control required.

It is understood that minor variation from the form of the invention herein may be made without departure from the spirit and scope of the invention, and that the specification and drawings are to be considered as merely illustrative rather than limiting.

I claim:
1. A flexible wing, comprising:
a primary wing having a longitudinal keel, leading edge members extending angularly rearwardly from the forward end of said keel on opposite sides thereof, and flexible wing panels secured to and between said keel and said leading edge members;
a pair of secondary wings mounted on the rear portions of said leading edge members outwardly thereof;
and actuating means operable to laterally extend and retract said secondary wings selectively.

2. A wing according to claim 1, wherein said actuating means is operable to extend and retract said secondary wings collectively and differentially.

3. A flexible wing, comprising:
a primary wing having a longitudinal keel, leading edge members extending angularly rearwardly from the forward end of said keel on opposite sides thereof, and flexible wing panels secured to and between said keel and said leading edge members;
a pair of secondary wings mounted on the rear portions of said leading edge members outwardly of said primary wing;
said secondary wings each having a substantially triangular, flexible wing panel secured along its inner edge to the respective leading edge member;
a leading edge boom secured along the outer edge of each of said secondary wing panels and being pivotally attached at the forward end thereof to the respective leading edge member;
and actuating means operable to laterally extend and retract said secondary wings selectively.

4. A wing according to claim 3 wherein said booms have integral arm portions extending inwardly below said primary wing, said actuating means being connected directly to said arms.

5. A flexible wing, comprising:
a primary wing having a longitudinal keel, leading edge members extending angularly rearwardly from the forward end of said keel on opposite sides thereof, and flexible wing panels secured to and between said keel and said leading edge members;
a pair of secondary wings mounted on the rear portions of said leading edge members outwardly of said primary wing;
said secondary wings each having a substantially triangular, flexible wing panel secured along its inner edge to the respective leading edge member;
a leading edge boom secured along the outer edge of each of said secondary wing panels;
said booms being pivotally attached at their forward ends to the respective leading edge members to swing substantially in the plane of said primary wing;
and actuating means operable to extend and retract said secondary wings selectively.

6. A wing according to claim 5 wherein said actuating means includes roll control means and pitch control means coupled to said booms to swing the booms inwardly and outwardly, collectively and differentially.

7. A flexible wing, comprising:
a primary wing having a longitudinal keel, leading edge members extending angularly rearwardly from the forward end of said keel on opposite sides thereof, and flexible wing panels secured to and between said keel and said leading edge members;
a pair of secondary wings mounted on the rear portions of said leading edge members outwardly of said primary wing;
said secondary wings each having a substantially triangular, flexible wing panel secured along its inner edge to the respective leading edge member;
a leading edge boom secured along the outer edge of each of said secondary wing panels;
said booms being pivotally attached at their forward ends to the respective leading edge members to swing substantially in the plane of said primary wing;
actuating means operable to extend and retract said secondary wings selectively;
and said actuating means including roll and pitch control means mounted on said keel.

References Cited by the Examiner
UNITED STATES PATENTS
3,135,483   6/1964   Girard _____ 244—75

OTHER REFERENCES
NASA TN D–1946, pages 29–31, 8–1963, Full-Scale Wind Tunnel Investigation of a Flexible-Wing Manual Test Vehicle, Johnson, Jr. and Hassel, Jr.

B. BELKIN, *Assistant Examiner.*

MILTON BUCHLER, *Primary Examiner.*